March 7, 1972   J. C. MacDONALD   3,647,587
METHOD OF INSTALLING INVISIBLE SEAMS
Filed June 23, 1969
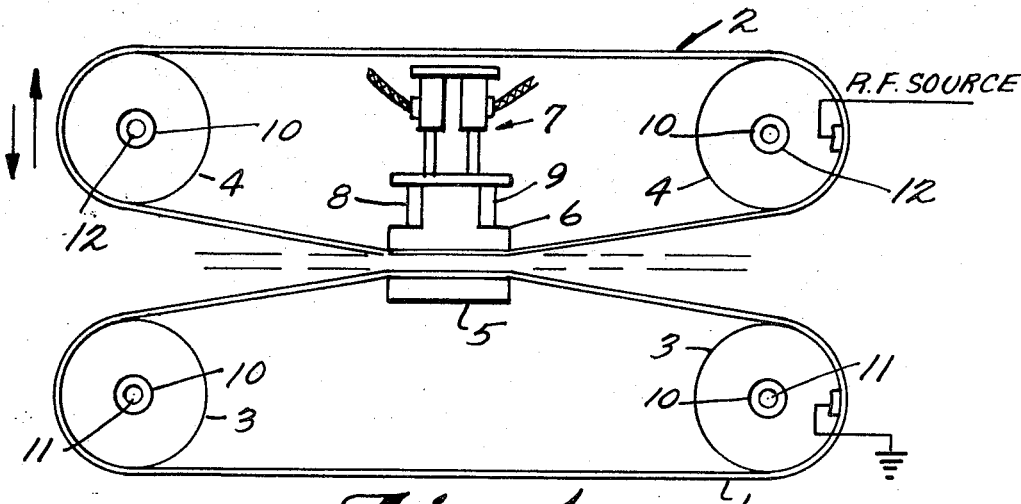
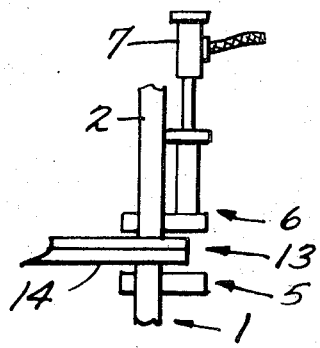
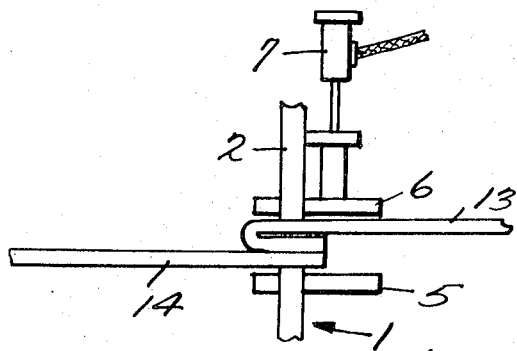
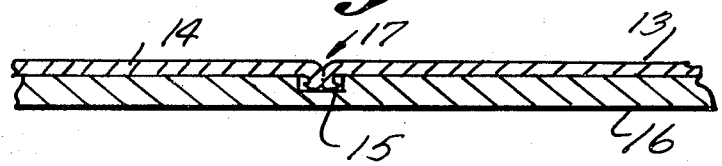
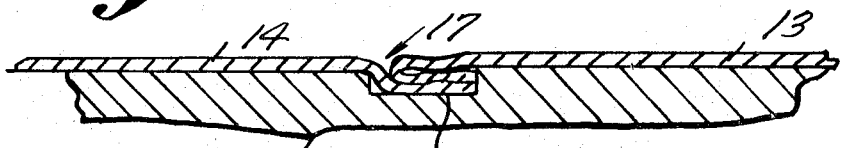
INVENTOR
JOHN CLIFFORD MacDONALD
BY Cushman, Darby & Cushman
ATTORNEYS United States Patent Office 3,647,587
Patented Mar. 7, 1972

3,647,587
METHOD OF INSTALLING INVISIBLE SEAMS
John Clifford MacDonald, Andover, Mass., assignor to Burlington Industries, Inc., Greensboro, N.C.
Filed June 23, 1969, Ser. No. 835,552
Int. Cl. E04f 15/10
U.S. Cl. 156—71                                                    1 Claim

ABSTRACT OF THE DISCLOSURE

A method is provided for installing on a supporting surface plastic sheets which have been bonded using radio frequency energy to dielectrically heat seal the sheets whereby the seam formed is inserted in a groove provided in the supporting surface to render said seam invisible.

---

This invention relates to a process for dielectrically securing together continuous lengths of plastic coated fabrics. This invention further relates to a method of installing these seamed lengths of plastic coated fabric on an appropriate backing or supporting base so as to provide an invisible seam.

It is desirable and often necessary to join together relatively narrow lengths of fabric or other material to form lengths of sufficient width for a desired application. When the pieces to be joined together to form the new width of material are particularly long, such as with two rolls of material, a problem is presented as to how to provide the necessary, continuous seam between the edges of the two rolls. This problem is further complicated when the materials to be joined are plastic or plastic covered and cannot be handled with conventional fabric stitching equipment. It is known in the art that thermoplastic materials or thermoplastic coated materials can be conveniently sealed together by the application to the overlapping layers of sufficient heat and pressure to fuse the thermoplastic surfaces together; however, devices for effecting this type of fusion have not been suitable for forming a continuous bond as required in seaming together long lengths of material as they characteristically provide a bond only over a relatively short area at one time and the seaming process must therefore be repeated over and over, which is time consuming and expensive.

It is therefore an object of the present invention to provide a dielectric heat sealing process suitable for forming a continuous seam between lengths of thermoplastic or thermoplastic coated material.

It is a further object of this invention to provide a means for invisibly installing on suitable backing pieces of material which have been joined using the continuous seaming apparatus of this invention. The application of seamed material by the process of this invention finds particular utility in such uses as providing decking for boats or coverings for mobile home tops.

The process of this invention may best be understood by reference to the continuous, rotary, dielectric heat sealing apparatus shown in the drawings and which is conveniently employed according to the present invention. These drawings comprise the following:

FIG. 1 is a side elevation of heat sealing apparatus for use herein:

FIGS. 2 and 3 are front elevation views showing alternative heat sealing embodiments; and FIGS. 4 and 5 are vertical sectional views showing installation of the plastic material on a supporting surface according to the invention.

There is shown in FIG. 1 two flexible metallic belts 1 and 2, each operatively mounted to receive the plastic material over and around a set of two rollers each, 3 and 4, respectively, which drive the belts in the same direction and parallel to each other. Two pressure shoes, 5 and 6, are provided which are somewhat wider than the flexible metallic belts 1 and 2 which pass over these shoes. One of these pressure shoes 5 is stationary and so disposed as to be in contact with and provide firm support for the belt 1, which passes over it in the area directly facing belt 2. The other pressure shoe 6, is operatively attached to a means 7, for moving it into contact with the lower shoe 5, and upward out of contact with shoe 5. This means 7 for moving the shoe 6 upwards and downwards can be any suitable device so long as it is capable of exerting sufficient force against the shoe to permit formation of a satisfactory bond between the layers of thermoplastic material. Conveniently, a piston-cylinder operatively connected to a source of compressed air (not shown) and actuated by air pressure can be employed to move pressure shoe 6. Shoe 6 is insulated from the means for moving it up and down by phenolic insulators 8 and 9. Metal belt 2, which passes over shoe 6, must fit loosely enough over the rollers 4 and be sufficiently flexible that it will not break or deform when shoe 6 is moved downward to engage shoe 5. The two sets of rollers 3 and 4 are operatively mounted on spindles 11 and 12 by means of phenolic insulators 10. The spindles 11 and 12 are turned by conventional electric motors (not shown) operatively connected with said spindles.

In operation, the two thermoplastic surfaces 13 and 14 which are to be sealed are placed face to face in an overlapping fashion (see FIGS. 2 and 3) and passed onto the lower metal belt 1. The pressure shoe 6 is activated by the means 7, so that it presses down metal belt 2 onto the material to be sealed which is supported on belt 1. High frequency electrical energy in the radio frequency range is supplied from a suitable R.F. source through suitable connection (not shown) to metal belt 2 through the rollers. The means for providing the necessary R.F. energy to the metallic belt of this invention is conventional and may be advantageously accomplished for example, by means of brushes operatively connected to the R.F. source and contacting the roller 4 (see FIG. 1) as shown for example, in U.S. Pat. No. 3,188,259 to Leger. Belt 1 is grounded through the rollers 3, over which it turns. The grounding of roller 3 can be accomplished, for example by brushes contacting the roller in the same manner that R.F. energy is supplied to roller 4. As the layers of material to be sealed are conveyed through the area between the two pressure shoes 5 and 6, radio frequency heating, sufficient to fuse the two surfaces occurs.

Suitable plastic surfaces which can be joined according to the present invention are, for example, thermoplastics such as polyvinyl chloride or acetate or vulcanizable materials or fabrics, etc., which have been covered with these materials or thermoplastics.

By way of example, the apparatus employed in the process of this invention can be constructed employing belt carrier rollers 24 inches in diameter and using belts providing a total working contact area of 28 square inches and ¼ inch in width. The belt is driven by a 1 HP. electric motor and the pressure shoe is activated by air pressure. The space between the two belts when open is five inches. A ten kilowatt output, continuous duty R.F. generator provides the electrical energy for effecting the seal. The R.F. generator is equipped with a dual range arc anticipator that will instantly shut off R.F. power and, if desired, stop movement of the belt, should arcing occur. A water cooling system to prevent overheating of the belt is provided and operated by a solenoid valve through a switch and metering valve. The belt system drive is provided with a switch for reversing travel direction to return any unsealed material to the sealing area, where it may be reset for forward motion with the same switch.

The apparatus of this invention having the above described features is capable of electronically welding, face to face, the selvage edges of two rolls of material to produce one roll of double width, i.e., two rolls approximately 80 inches wide (maximum) can be joined for the full length of the rolls, creating a single roll about 160 inches wide. The welding (sealing) process is done in a continuous manner, while the material is in motion, rather than by the conventional intermittent method.

It is also an object of this invention to provide a method for invisible installing on backing pieces of material which have been heat sealed together. According to the method of this invention, thermoplastic materials or thermoplastic covered material which have been heat sealed according to the process of the present invention using for example the heat sealing apparatus heretofore described whereby the thermoplastic surfaces are placed face to face in the manner shown in FIG. 2, or alternatively, in FIG. 3, and passed through the continuous dielectric heat sealer of this invention as heretofore described are installed on a backing so that the seam between the two pieces of materials is invisible. Following removal from the heat sealing device, the top layer of material 13 is folded back as further shown in FIGS. 4 and 5. A slot or groove 15 of suitable width is provided in the surface 16, e.g., deck of a boat, into which the seam is inserted as shown in FIGS. 4 and 5. The material can then, if desired, be secured to the backing by appropriate means, such as, for example, adhesive applied to the interface between the supporting surface and the material.

What is claimed is:
1. A method of installing on a supporting surface a sheet of plastic or plastic coated material formed by placing the plastic surfaces of two smaller sheets of said material face to face one on top of the other and heat sealing only a common edge of the two sheets together, which comprises providing a slot in said supporting surface just large enough to accommodate the seam formed by heat sealing the common edge of said two sheets of material together, unfolding said two sheets by pulling back the top sheet of said material so that the inside surfaces of the two smaller sheets which were facing each other now face outwardly and the two outer surfaces face inwardly, inserting said seam which binds the two smaller sheets together into said slot, and securing said inwardly facing surfaces to the supporting surface.

References Cited

UNITED STATES PATENTS

| | | | |
|---|---|---|---|
| 2,605,514 | 8/1952 | Eshenaur et al. | 156—71 X |
| 3,066,064 | 11/1962 | Pommer | 156—306 |
| 3,087,845 | 4/1963 | Patterson | 156—306 X |
| 3,506,516 | 4/1970 | Baumann | 156—306 X |

REUBEN EPSTEIN, Primary Examiner

U.S. Cl. X.R.

52—309; 156—152, 249, 293, 306